US012212193B2

(12) United States Patent
Doppler et al.

(10) Patent No.: US 12,212,193 B2
(45) Date of Patent: Jan. 28, 2025

(54) ELECTRICAL MACHINE

(71) Applicant: MELECS EWS GmbH, Siegendorf (AT)

(72) Inventors: Thomas Doppler, Tulln (AT); Leopold Hellinger, Ziersdorf (AT); Martin Johann Mayer, Reichenau an der Rax (AT)

(73) Assignee: MELECS EWS GmbH, Siegendorf (AT)

( * ) Notice: Subject to any disclaimer, the term of this patent is extended or adjusted under 35 U.S.C. 154(b) by 656 days.

(21) Appl. No.: 17/437,927

(22) PCT Filed: Mar. 6, 2020

(86) PCT No.: PCT/EP2020/056029
§ 371 (c)(1),
(2) Date: Sep. 10, 2021

(87) PCT Pub. No.: WO2020/182662
PCT Pub. Date: Sep. 17, 2020

(65) Prior Publication Data
US 2022/0170488 A1    Jun. 2, 2022

(30) Foreign Application Priority Data
Mar. 13, 2019    (AT) .............................. A 50213/2019

(51) Int. Cl.
*H02K 11/33*        (2016.01)
*B64D 11/02*        (2006.01)
(Continued)

(52) U.S. Cl.
CPC .............. *H02K 11/33* (2016.01); *F04B 35/04* (2013.01); *F04B 39/06* (2013.01); *F04B 39/121* (2013.01);
(Continued)

(58) Field of Classification Search
CPC ...... H02K 11/33; H02K 5/08; H02K 2211/03; H02K 5/10; H02K 7/14; H02K 5/128;
(Continued)

(56) References Cited

U.S. PATENT DOCUMENTS

| 6,450,786 B1 | 9/2002 | Koch et al. |
| 6,583,532 B2 | 6/2003 | Hein et al. |

(Continued)

FOREIGN PATENT DOCUMENTS

| CN | 101394110 | 3/2009 |
| CN | 107664115 | 2/2018 |

(Continued)

OTHER PUBLICATIONS

PCT International Search Report dated May 25, 2020 based on PCT/EP2020/056029 filed Mar. 6, 2020.

*Primary Examiner* — Peter J Bertheaud
(74) *Attorney, Agent, or Firm* — Cozen O'Connor

(57) ABSTRACT

An electrical machine includes an open-loop or closed-loop control unit and a fluidic actuator, wherein the open-loop or closed-loop control unit is established for open-loop or closed-loop control of the actuator, where the open-loop or closed-loop control unit has a carrier plate cast in a thermally conductive casting compound, and where the open-loop or closed-loop control unit makes contact with a fluid-filled chamber of the actuator in the region of the casting compound such that it becomes possible to dispense with separate cooling devices in the open-loop or closed-loop control unit.

11 Claims, 1 Drawing Sheet

(51) Int. Cl.

| | | |
|---|---|---|
| *F04B 35/04* | (2006.01) | |
| *F04B 39/06* | (2006.01) | |
| *F04B 39/12* | (2006.01) | |
| *F04C 18/02* | (2006.01) | |
| *F04C 23/00* | (2006.01) | |
| *F04C 29/04* | (2006.01) | |
| *F04D 13/06* | (2006.01) | |
| *F04D 19/00* | (2006.01) | |
| *F04D 25/06* | (2006.01) | |
| *H02K 5/08* | (2006.01) | |
| *H02K 5/10* | (2006.01) | |
| *H02K 5/128* | (2006.01) | |
| *H02K 5/22* | (2006.01) | |
| *H02K 7/14* | (2006.01) | |
| *H02K 9/22* | (2006.01) | |
| *H02K 15/12* | (2006.01) | |

(52) U.S. Cl.
CPC ........ *F04C 18/0215* (2013.01); *F04C 23/008* (2013.01); *F04C 29/047* (2013.01); *F04D 13/06* (2013.01); *F04D 13/064* (2013.01); *F04D 13/0686* (2013.01); *F04D 19/002* (2013.01); *F04D 25/0646* (2013.01); *H02K 5/08* (2013.01); *H02K 5/10* (2013.01); *H02K 5/128* (2013.01); *H02K 5/225* (2013.01); *H02K 7/14* (2013.01); *H02K 9/223* (2021.01); *H02K 9/227* (2021.01); *H02K 15/12* (2013.01); *B64D 11/02* (2013.01); *F04C 2240/30* (2013.01); *F04C 2240/808* (2013.01); *H02K 2211/03* (2013.01)

(58) Field of Classification Search
CPC ........ H02K 15/12; H02K 5/225; H02K 9/223; H02K 9/227; F04D 13/064; F04D 25/0646; F04D 13/0686; F04D 13/06; F04D 19/002; F04B 35/04; F04B 39/06; F04B 39/121; F04C 18/0215; F04C 2240/808; F04C 23/008; F04C 2240/30; F04C 29/047

See application file for complete search history.

(56) References Cited

U.S. PATENT DOCUMENTS

| | | | |
|---|---|---|---|
| 6,619,933 | B2 * | 9/2003 | Ikeda .................... F04C 23/008 62/505 |
| 7,474,024 | B2 * | 1/2009 | Nakanishi ............. F04D 13/064 310/71 |
| 7,839,046 | B2 | 11/2010 | Hashimoto et al. |
| 8,845,298 | B2 | 9/2014 | Larsen et al. |
| 10,641,273 | B2 | 5/2020 | Spinner et al. |
| 2002/0027396 | A1 | 3/2002 | Hein et al. |
| 2004/0062664 | A1 | 4/2004 | Weigold et al. |
| 2006/0057002 | A1 | 3/2006 | Nakanishi |
| 2009/0079293 | A1 | 3/2009 | Hashimoto et al. |
| 2011/0236236 | A1 | 9/2011 | Larsen et al. |
| 2012/0217117 | A1 | 8/2012 | Gramann et al. |
| 2014/0294621 | A1 * | 10/2014 | Narita .................... H02K 5/128 417/354 |
| 2016/0123336 | A1 | 5/2016 | Spinner et al. |
| 2016/0178186 | A1 | 6/2016 | Kusunoki et al. |
| 2018/0009425 | A1 | 1/2018 | Feigel |

FOREIGN PATENT DOCUMENTS

| | | |
|---|---|---|
| DE | 19927741 | 12/1999 |
| DE | 19902837 | 8/2000 |
| DE | 19903817 | 8/2000 |
| DE | 10052797 | 5/2002 |
| DE | 102014214095 | 1/2016 |
| EP | 2429273 | 3/2012 |
| JP | 2000-073962 | 3/2000 |
| JP | 2002-536582 | 10/2002 |
| JP | 2006-083760 | 3/2006 |
| JP | 2019/002404 | 1/2019 |
| WO | WO 2010/134575 | 11/2010 |
| WO | WO 2014/192280 | 12/2014 |
| WO | 2018114349 | 6/2018 |

* cited by examiner

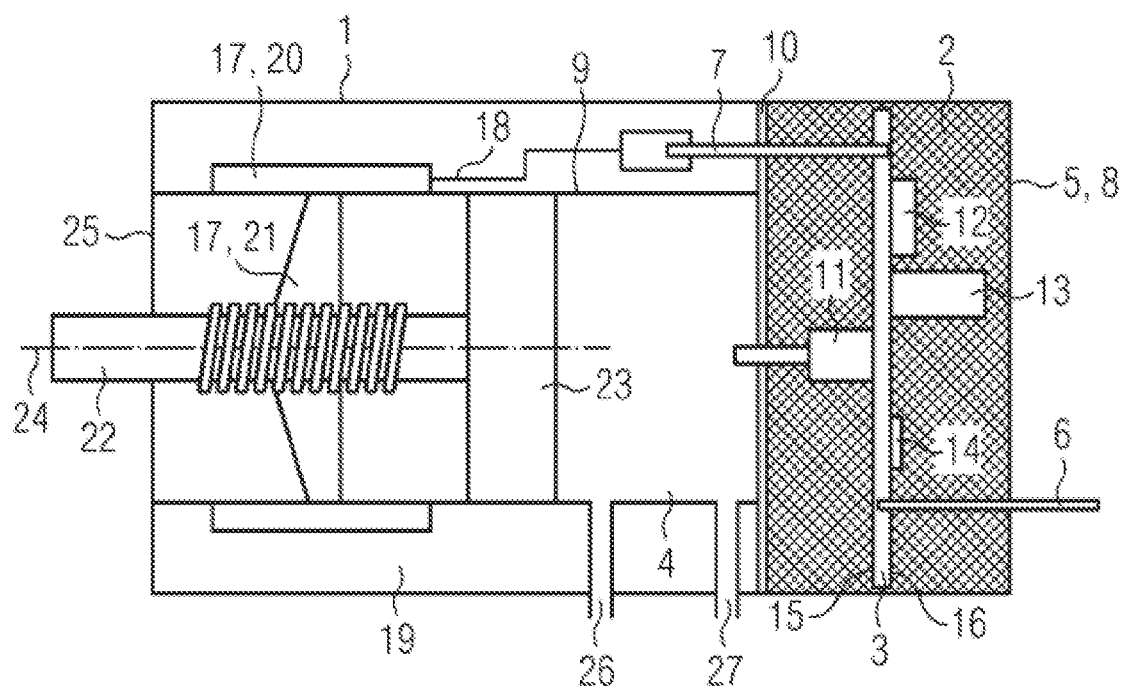

ELECTRICAL MACHINE

CROSS-REFERENCE TO RELATED APPLICATIONS

This is a U.S. national stage of application No. PCT/EP2020/056029 filed 6 Mar. 2020. Priority is claimed on Austrian Application No. A50213/2019 filed 13 Mar. 2019, the content of which is incorporated herein by reference in its entirety.

BACKGROUND OF THE INVENTION

1. Field of the Invention

The invention relates to an electrical machine having an open-loop or closed-loop control unit and a fluidic actuator, where the open-loop or closed-loop control unit is provided for open-loop or closed-loop control of the actuator.

2. Description of the Related Art

Particularly in automotive electronics, there is frequently the need to integrate devices with control electronics into a motor, into a gearbox, into a pump or into chassis components, in order to use limited installation spaces as effectively as possible and to keep conductor routes short. Heat output by carrier plates equipped with transistors, for instance, has to be effectively discharged here in order to avoid damage to devices and a reduced service life.

EP 2 429 273 A2 discloses a cooling apparatus for an electrical device. Here, an electronic circuit is arranged on a carrier plate. Cylindrical press-on domes make mechanical and thermal contact with elements producing power loss. The press-on domes are provided between inner housing walls and elements producing the power loss and press the carrier plate against an inner side of a housing cover embodied as a cooling element. Heat from elements producing the power loss is conveyed via this housing cover to an environment.

WO 2018/114349 A1 shows a housing for an electrical machine, in which a carrier plate is provided with a cooling apparatus arranged circumferentially thereupon.

In their conventional forms, these approaches are disadvantageous because dedicated cooling apparatuses, for which corresponding installation space must be provided, are used for the electrical device and the electrical machine or for cooling electronic components.

SUMMARY OF THE INVENTION

In view of the foregoing, it is an object of the invention to provide a compact electrical machine that is further developed in comparison to the prior art and that has electronic components which are effectively cooled without additional facilities, however.

This and other objects and advantages are achieved in accordance with the invention by an electrical machine in which an open-loop or closed-loop control unit has a carrier plate cast with a heat-conductive casting compound, where the open-loop or closed-loop control unit makes contact with a fluid-filled chamber of the actuator in the region of the casting compound.

As a result of the carrier plate being surrounded by the casting compound, heat is transferred from mounting elements of the carrier plate, which produce power loss, directly into the casting compound. The open-loop or closed-loop control unit makes contact with the fluid-filled chamber of the actuator in the region of the casting compound. As a result, heat transmitted to the casting compound is output to the fluid. The mounting elements of the carrier plate or the open-loop or closed-loop control unit are therefore effectively cooled. It is possible to dispense with separate cooling apparatuses arranged on the carrier plate, for instance, as a result of which installation space can be saved and component masses can be reduced. On account of the casting compound, advantageous protection of the carrier plate and its mounting elements from environmental influences (e.g., from penetrating substances) and loads (e.g., against impacts) is moreover effected.

It is favorable if the casting compound is embodied in polyurethane with a Shore A hardness in the region between 48 and 53.

With this measure, the carrier plate and its mounting elements are enclosed particularly tightly by the casting compound, i.e., are shielded particularly effectively against environmental influences. Furthermore, a use of polyurethane brings about a minimal component mass.

An advantageous embodiment is obtained when the casting compound is cast in a first housing of the open-loop or closed-loop control unit, which is closed on one side via a plate, where the plate adjoins a second housing of the actuator.

This measure achieves a compact embodiment of the machine. It is possible to dispense with laying cables between the open-loop or closed-loop control unit and the actuator.

A favorable solution is achieved when the casting compound is cast in a first housing of the open-loop or closed-loop control unit, where the casting compound adjoins a second housing of the actuator.

This measure achieves a particularly effective cooling of the open-loop or closed-loop control unit, because heat from the casting compound is output directly to the second housing or to the fluid-filled chamber of the actuator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of exemplary embodiments, in which, by way of example, in which:

The FIGURE is a schematic sectional illustration of a side elevation of an inventive machine.

DETAILED DESCRIPTION OF THE EXEMPLARY EMBODIMENTS

The FIGURE shows an exemplary embodiment of a sectional representation of an inventive electrical machine.

An open-loop or closed-loop control unit formed as an electronic controller 5 has a carrier plate 3 which, completely cast by a heat-conductive casting compound 2 made from polyurethane, is arranged in a first housing 8, which is formed in polyamide reinforced with glass fibers.

A first mounting element 11, which is formed as a pressure sensor, and a second mounting element 12, a third mounting element 13 and a fourth mounting element 14, which are encased by the casting compound 2, are provided on the carrier plate 3. The first mounting element 11 is arranged on a lower side 15 of the carrier plate 3, the second mounting element 12, the third mounting element 13 and the fourth mounting element 14 are arranged on a top side 16 of the carrier plate 3. The carrier plate 3 is therefore mounted on both sides.

The first housing 8 and the carrier plate 3 are formed to be cylindrical. The first housing 8 is closed on the face side via an inserted plate 10. The plate 10 is clamped with the first housing 8.

The casting compound 2 completely fills a housing interior formed by the first housing 8 and the plate 10. The polyurethane of the casting compound 2 has a Shore-A hardness in the region between 48 and 53, a heat conductivity of 0.97 W/mK and a glass temperature of approx. −60° C. The electrical machine can therefore be used in a large temperature range.

When the casting compound 2 is embodied in polyurethane, this is a favorable solution. In accordance with the invention, it can however also be conceivable to embody the casting compound 2 in silicon with a Shore A hardness in the region between 45 and 55, as a result of which with the embodiment in polyurethane, comparable properties of the casting compound 2 are achieved.

In the region of the top side 16 of the carrier plate 3, a first contact 6 formed as a first silver contact pin is connected with the carrier plate 3 and projects from the first housing 8. By way of this, first contact 6 and further contacts which are not visible in FIG. 1 and are likewise formed as silver contact pins, are connected in the region of the top side 16 with the carrier plate 3 and project from the first housing 8, and the carrier plate 3 is connected with a power supply, not shown.

In the region of the lower side 15 of the carrier plate 3, a second contact 7 formed as a second silver contact pin and further contacts not visible in FIG. 1 and formed as further silver contact pins are connected to the carrier plate 3.

The controller 5 is connected to a motor 17 of a fluidic actuator 1 formed as a hydraulic actuator by way of the second contact 7 and the further contacts arranged in the region of the lower side 15 of the carrier plate 3. The controller 5 is connected to the actuator 1 by way of a clamping connection. In accordance with the invention, it is also conceivable for screw connections to be provided between the controller 5 and the actuator 1.

The first contact 6, the second contact 7 and the further contacts are encased in part by the casting compound 2. A first conductor path 18 is provided between the second contact 7 and the motor 17, between which further contacts arranged in the region of the lower side 15 of the carrier plate 3 not visible further conductor paths.

The first conductor path 18 and the further conductor paths are arranged within the actuator 1, in a ring part 19 of the actuator 1. Cables running between the controller 5 and the actuator 1 are not required. The actuator 1 or its ring part 19 is connected flush with the open-loop or closed-loop control unit or closes flush with the first housing 8.

The motor 17 is formed as a brushless direct current electric motor with a ring-shaped stator 20 and a rotor 21. The stator 20 is provided in the ring part 19 of the actuator 1. The rotor 21, which is driven rotatably, but is immovably mounted in the actuator 1, is driven via the stator 20 or its connection to the controller 5.

Rotational movements of the rotor 21 are transmitted to a spindle-shaped section of a piston rod 22, as a result of which the piston rod 22 and a piston 23 connected hereto execute translational movements in the direction of a longitudinal axis 24.

The piston rod 22 and the piston 23 are provided in a cylinder 25 of the actuator 1, which is encased by the ring part 19. The piston rod 22 is mounted in the cylinder 25 by way of a bearing (not shown), and guided so that it can execute rotational and translational movements.

A first seal, which is likewise not shown, is provided between the piston rod 22 and the cylinder 25, in order to prevent humidity and particles etc. from penetrating into the cylinder 25.

A chamber 4 that is formed by the movable piston 23 and the cylinder 25 is filled with a hydraulic fluid. The cylinder 25 therefore functions as a second housing 9 in respect of this hydraulic fluid.

The chamber 4 or the second housing 9 directly adjoin the plate 10 of the controller 5. The open-loop or closed-loop control unit makes contact with the chamber 4 in the region of the casting compound 2. As a result, heat transmitted from the carrier plate 3 or the first mounting element 11, the second mounting element 12, the third mounting element 13 and/or the fourth mounting element 14 into the casting compound 2 is discharged from the casting compound 2 via the plate 10 into the chamber 4, i.e., to the hydraulic fluid.

In accordance with the invention, it is also possible to dispense with the plate 10, as a result of which the casting compound 2 directly adjoins the chamber 4.

The chamber 4 is connected to a hydraulics container (not shown) via a first hydraulics line 26, i.e., supplied with hydraulic fluid via this hydraulics container. The chamber 4 is connected to a hydraulic telescopic shock absorber, likewise not shown, of a motor vehicle via a second hydraulic line 27. A damping effect of the telescopic shock absorber is adjusted via the piston 23 or a pressure of the hydraulic fluid. To this end, the pressure is continuously measured in the chamber 4 via the pressure sensor or the first mounting element 11, the measuring probe of which projects into the chamber 4. A second seal (not shown) is provided between the first mounting element 11 and the cylinder 25, in order to prevent the casting compound 2 from being wet with hydraulic fluid.

A comparison of the measured pressure with a defined target pressure is performed continuously via the controller 5. On the basis of a difference between the measured pressure and the target pressure, the motor 17 is controlled by the controller 5 via corresponding voltage specifications to the stator 20, i.e., the motor 17 is switched on or off or a speed of the rotor 21 is adjusted to reach or retain the target pressure in the hydraulic fluid or in the telescopic shock absorber via corresponding piston positions and movements.

If the actuator 1 is formed as a hydraulic actuator, then this is a favorable solution. In accordance with the invention, it is also conceivable, however, to form the actuator 1 as a pneumatic actuator, for instance, and to use this to adjust brake cylinder pressures in a bogie brake of a rail vehicle.

It is also conceivable for the open-loop or closed-loop unit not to be used as a controller 5, but instead as a control unit, i.e., without measurements of a variable to be closed via a sensor or without a repercussion of this variable on a manipulated variable. For instance, the control unit can be used in a hydraulic clamping device.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electrical machine comprising:
    an open-loop or closed-loop control unit including a carrier plate which is cast within a heat-conductive casting compound;
    a fluidic actuator, the open-loop or closed-loop control unit providing an open-loop or closed-loop control of the actuator; and
    a plate inserted between the casting compound and a fluid filled chamber, the plate extending across an entirety of the casting compound or the casting compound being cast in a first housing of the open-loop or closed-loop control unit, and the casting compound indirectly adjoining a second housing of the actuator via the plate inserted between the casting compound and the fluid filled chamber;
    wherein the open-loop or closed-loop control unit indirectly contacts the fluid-filled chamber of the actuator in a region of the casting compound via the plate inserted between the casting compound and the fluid filled chamber.

2. The electrical machine as claimed in claim 1, wherein the casting compound is embodied in polyurethane with a Shore A hardness in a region between 48 and 53.

3. The electrical machine as claimed in claim 1, wherein the casting compound is embodied in silicon with a Shore A hardness in the region between 45 and 55.

4. The electrical machine as claimed in claim 1, wherein components are mounted on both sides of the carrier plate.

5. The electrical machine as claimed in claim 2, wherein components are mounted on both sides of the carrier plate.

6. The electrical machine as claimed in claim 3, wherein components are mounted on both sides of the carrier plate.

7. The electrical machine as claimed in claim 1, wherein the open-loop or closed-loop control unit comprises a controller and includes a sensor arranged on the carrier plate.

8. The electrical machine as claimed in claim 1, wherein the actuator comprises a hydraulic actuator.

9. The electrical machine as claimed in one of claim 1, wherein the actuator comprises a pneumatic actuator.

10. The electrical machine as claimed in claim 1, wherein the open-loop or closed-loop control unit is connected to the actuator via at least one electrical contact.

11. The electrical machine as claimed in claim 1, wherein the casting compound is cast in a first housing of the open-loop or closed-loop control unit, which is closed on one side via the plate; and wherein the plate adjoins the second housing of the actuator.

\* \* \* \* \*